US009746392B2

(12) United States Patent
Hinnant, Jr. et al.

(10) Patent No.: US 9,746,392 B2
(45) Date of Patent: Aug. 29, 2017

(54) SYSTEMS AND METHODS TO DETERMINE NAVIGATION STATES OF A PLATFORM

(75) Inventors: Harris O. Hinnant, Jr., Seattle, WA (US); Darin W. Brekke, Fox Island, WA (US)

(73) Assignee: The Boeing Company, Chicago, IL (US)

( * ) Notice: Subject to any disclaimer, the term of this patent is extended or adjusted under 35 U.S.C. 154(b) by 847 days.

(21) Appl. No.: 13/568,961

(22) Filed: Aug. 7, 2012

(65) Prior Publication Data
US 2014/0046535 A1   Feb. 13, 2014

(51) Int. Cl.
*G06F 11/30*   (2006.01)
*G01M 5/00*   (2006.01)

(52) U.S. Cl.
CPC ........ *G01M 5/0016* (2013.01); *G01M 5/0041* (2013.01)

(58) Field of Classification Search
CPC ...... B64D 2027/266; B64D 2045/0035; B64D 2045/0045; B64D 2045/0055; G01M 5/0041; G01M 5/0016; G01M 5/0066; G01M 5/0083; B64C 2201/122; B64C 2201/126; B64C 2201/127; B64C 2201/146
USPC ..... 701/34.4, 30, 29, 3, 1, 102, 101, 14, 16, 701/22, 49, 50; 340/967; 342/357.22
See application file for complete search history.

(56) References Cited

U.S. PATENT DOCUMENTS

| 7,307,585 | B2 | 12/2007 | Hinnant, Jr. et al. | |
| 8,155,794 | B2 * | 4/2012 | Mangalam | G01M 9/06 700/282 |
| 9,073,623 | B1 * | 7/2015 | Suh | B64D 45/00 |
| 2006/0004499 | A1 * | 1/2006 | Trego | B64D 45/00 701/31.4 |
| 2007/0096979 | A1 * | 5/2007 | Hinnant, Jr. | G01M 5/0016 342/357.22 |
| 2007/0162821 | A1 * | 7/2007 | Hwang | H03M 13/118 714/758 |
| 2007/0198225 | A1 * | 8/2007 | Roach | G05B 23/0221 702/189 |
| 2009/0018703 | A1 * | 1/2009 | Mangalam | G01M 9/06 700/282 |
| 2009/0157358 | A1 * | 6/2009 | Kim | G01L 1/16 702/185 |

(Continued)

OTHER PUBLICATIONS

Steven Ray Hall, "Parity Vector Compensation for FDI" S.B., Massachusetts Institute of Technology, Feb. 1982, (84 pages).

*Primary Examiner* — Jelani Smith
*Assistant Examiner* — Luis A Martinez Borrero
(74) *Attorney, Agent, or Firm* — Hanley, Flight & Zimmerman, LLC

(57) ABSTRACT

Systems and methods to determine navigation states of a platform are disclosed. An example system includes a first processing node to determine a first aeroelastic navigation state of a platform at a first structural location of the platform with respect to a first aeroelasticity reference, a second processing node to determine a second aeroelastic navigation state of the platform at a second structural location of the platform with respect to the first aeroelasticity reference or a second aeroelasticity reference, and a storage device to store a platform navigation state based on at least one of the first or second aeroelastic navigation states.

25 Claims, 12 Drawing Sheets

(56) References Cited

U.S. PATENT DOCUMENTS

| | | | | |
|---|---|---|---|---|
| 2010/0076743 A1* | 3/2010 | Mathews | ............ | G05B 23/0256 703/20 |
| 2010/0250047 A1* | 9/2010 | Balasu | .................. | B60T 17/221 701/31.4 |
| 2011/0154907 A1* | 6/2011 | Schmidt | .................. | B64C 25/00 73/800 |
| 2011/0167024 A1* | 7/2011 | Maldonado Diaz | ... | G06N 3/086 706/10 |
| 2011/0245999 A1* | 10/2011 | Kordonowy | ......... | G07C 5/0816 701/3 |
| 2011/0313614 A1* | 12/2011 | Hinnant, Jr. | ........ | G01M 5/0041 701/33.9 |
| 2012/0253698 A1* | 10/2012 | Cokonaj | .............. | B06B 1/0622 702/39 |
| 2012/0310449 A1* | 12/2012 | Hinnant, Jr. | ............ | B64D 45/00 701/3 |

* cited by examiner

1

SYSTEMS AND METHODS TO DETERMINE NAVIGATION STATES OF A PLATFORM

BACKGROUND

Platforms such as aircraft and ground platforms are subject to structural stresses that may cause flexure of the structure of the platform. The platform may be designed to incur such flexure. Flexure may also be predicted by simulating operation of the platform. However, these methods of determining or predicting flexure do not provide for adequate control of the platform structure for real-time operational or environmental conditions.

Known methods of navigating, such as using a Global Positioning System (GPS), provide earth-relative position, velocity, and altitude measurements. These known methods provide data points representative of a platform as a whole and provide no information regarding the structure of the platform.

Accordingly, there is a need for methods of determining navigation states of a platform beyond the position, velocity, and altitude of the platform as a whole. There is a further need for determining states of the structure of a platform for use in controlling the structure of the platform in response to external environmental variables.

SUMMARY

A disclosed example system includes a first processing node to determine a first aeroelastic navigation state of a platform at a first structural location of the platform with respect to a first aeroelasticity reference, a second processing node to determine a second aeroelastic navigation state of the platform at a second structural location of the platform with respect to the first aeroelasticity reference or a second aeroelasticity reference, and a storage device to store a platform navigation state based on at least one of the first or second aeroelastic navigation states.

A disclosed example method includes determining, using a first logic circuit, a first aeroelastic navigation state of a platform at a first structural location of the platform with respect to a first aeroelasticity reference, and determining, using a second logic circuit, a second aeroelastic navigation state of the platform at a second structural location of the platform with respect to the first aeroelasticity reference or a second aeroelasticity reference, and storing a platform navigation state based on at least one of the first or second aeroelastic navigation states.

The features, functions, and advantages that have been discussed can be achieved independently in various embodiments or may be combined in yet other embodiments, further details of which can be seen with reference to the following description and drawings.

DETAILED DESCRIPTION

Figure 1:
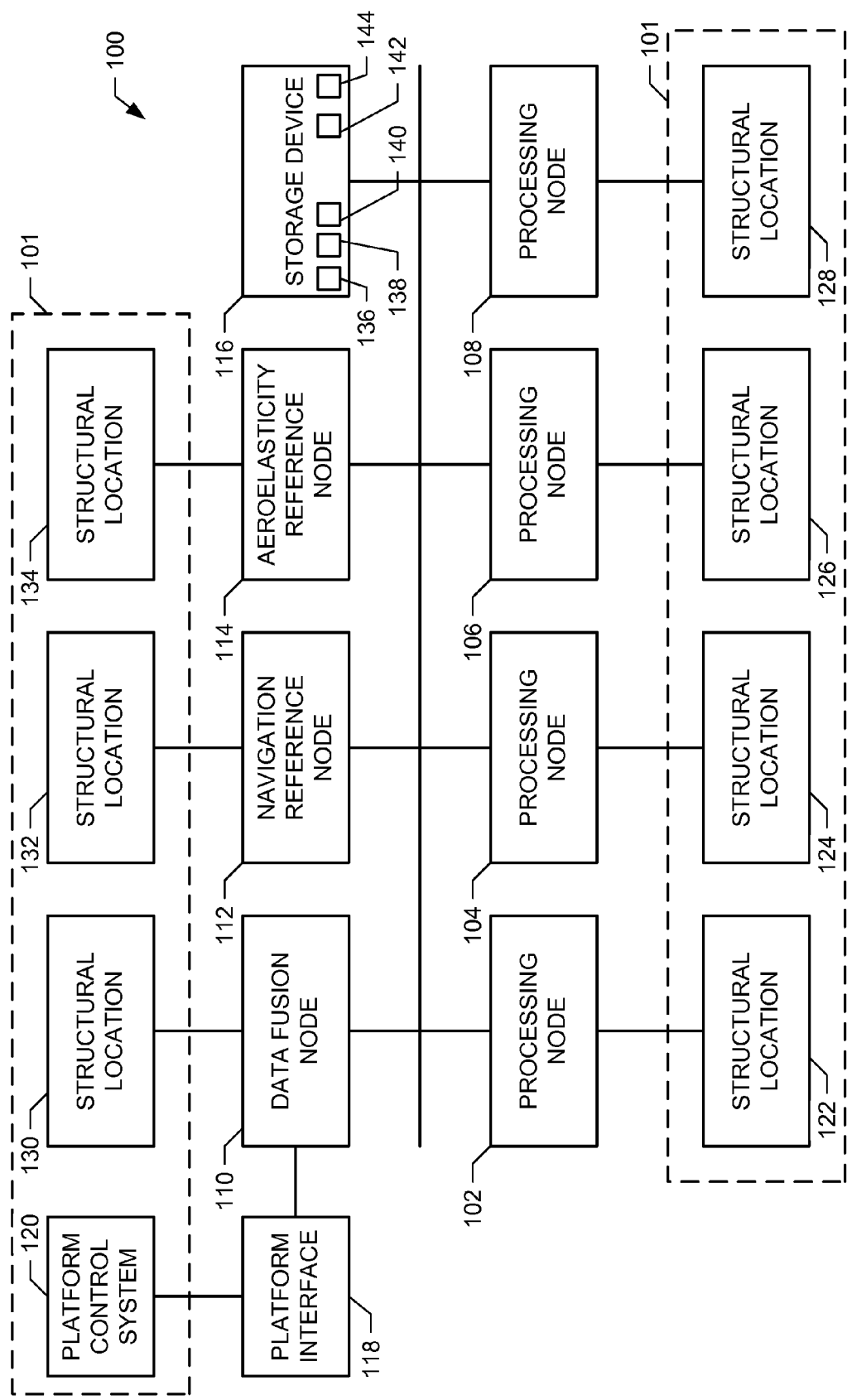
FIG. 1 is a block diagram of an example aeroelasticity measurement system, including multiple processing nodes, to determine a navigation state of a platform.

Known integrated aeroelasticity measurement systems provide aeroelasticity measurements in a flight test environment. Some such systems are described in U.S. Pat. No. 7,307,585, which describes collecting navigation data to generate navigation solutions for an aircraft and collects aeroelasticity data to determine an aeroelasticity of an aircraft.

In contrast to known methods and devices, example systems and methods disclosed herein include multiple processing nodes to provide aeroelastic measurements of the structure of a platform to enable control of flexible platform structures, provide structural health monitoring, and/or to provide performance improvements (e.g., optimizations). Example systems and methods disclosed herein provide distributed navigation by combining multiple aeroelastic navigation states and/or aeroelasticity measurements from multiple processing nodes to derive a platform navigation state. Example systems and methods disclosed herein further enable processing node redundancy and fault and/or failure detection in multiple processing nodes by determining parity vectors for the multiple processing nodes and/or by determining the aeroelastic bending between the structural locations associated with the processing nodes.

Examples disclosed herein may be used to determine navigation states of a platform. Examples disclosed herein include a network of multiple processing nodes configured to provide a distributed navigation system for a platform. In some examples, the processing nodes are time-synchronized and are linked by fiber optic connections and/or other types of connections.

As used herein, a platform may refer to any type of structure including, but not limited to, aircraft, spacecraft, ground vehicles, launch vehicles, water vehicles such as ships, fixed structures such as bridges or buildings, and/or lighter-than-air platforms such as balloons or dirigibles. Some platforms such as aircraft are discussed in the examples below. However, such examples are not limited to these platforms.

As used herein, a structural location of a platform may include, alone or in combination, one or more points on and/or within the structure of the platform, one or more areas of the structure of the platform, one or more volumes of the structure of the platform, one or more cross-sections of a structure of the platform, and/or any other dimension(s) and/or characteristic(s) of a structure of the platform.

As used herein, adjacent structural locations are structural locations associated with a processing node and having no structural locations and/or processing nodes physically located between or substantially between the adjacent structural locations. For example, in a linear row of 3 structural locations extending from the first being leftmost to the third being rightmost, the first structural location is adjacent the second, the third structural location is adjacent the second, and the second structural location is adjacent both of the first and third. In some other examples, adjacent structural locations may refer to structural locations between which a structural deformity (e.g., twisting, bending, etc.) can be estimated or determined without estimating or determining a structural deformity of either structural location with respect to a third structural location.

Some aircraft formation flight requires sensor stabilization, where light detection and ranging (LiDAR) and/or other sensors are used to detect the wake of other aircraft in the formation. Aeroelasticity measurements provide information about the formation flight process of entering and maintaining position in the wake of a leading aircraft. Example systems and methods disclosed herein provide aeroelasticity measurements and a navigation state of a platform to enable the platform to safely fly in formation. In particular, example systems and methods may be used to take into account the aeroelasticities and/or the navigation states of the platform and/or other platforms in the formation to evaluate the performance and/or safety of the platforms.

FIG. 1 is a block diagram of an example aeroelasticity measurement system 100 to determine a navigation state of a platform 101. The example aeroelasticity measurement system 100 of FIG. 1 includes multiple processing nodes 102-108, a data fusion node 110, a navigation reference node 112, an aeroelasticity reference node 114, and a storage device 116. In the example of FIG. 1, the data fusion node 110 also manages a platform interface 118 with other platform systems such as a platform control system 120.

Each of the example nodes 102-114 is associated with a corresponding structural location 122-134 of the platform 101. Each of the example processing nodes 102-108 repeatedly calculates the aeroelasticity of the corresponding structural location 122-128. Redundant measurements made by the processing nodes 102-108 are used to generate a consistency check of the system 100 (e.g., of the nodes 102-114 in the system 100). In the example of FIG. 1, a parity vector is generated for each of the example nodes 102-114 to detect and isolate any faults (e.g., slowly evolving drift) in the respective outputs of the processing nodes 102-114. The data fusion node 110 determines a distributed parity vector among the processing nodes 102-108 by stabilizing each node with the real-time aeroelastic data. In some examples, the data fusion node 110 determines the parity vector by generating a parity coordinate frame based on the aeroelastic navigation states of each of the example processing nodes 102-114. The data fusion node 110 uses the distributed parity vector to compare the self-consistency of the nodes 102-114 and can detect and isolate multiple failures of the nodes 102-114 using the distributed parity vector. The example data fusion node 110 uses the platform navigation state (e.g., via the aeroelastic navigation states from the processing nodes 102-108) to determine a unique distributed parity vector.

In some examples, the aeroelastic navigation states determined by the processing nodes 102-108 are time-stamped navigation solutions for a center of navigation of the platform 101. These navigation states include aeroelastic measurements at the processing nodes 102-108, aeroelastic measurements between the processing nodes 102-108, and vectors of deflection of the structure of the platform 101 (e.g., deflection from the locations of the processing nodes 102-108 and/or from the structural locations 122-128 corresponding to the processing nodes 102-108). For example, a processing node 102 located on a wing of an aircraft may include an inertial measurement unit mounted to the leading edge of the wing, and a fiber strain line (e.g., a fiber Bragg grating sensor) extending from the leading edge to the trailing edge of the wing. The example processing node 102 computes an aeroelastic navigation state and relates the aeroelastic navigation state to the wing chord line to determine a vector of deflection from the leading edge of the wing along the chord line to the trailing edge of the wing.

In some examples, the aeroelastic navigation state determined by a processing node 102-108 includes a relation from the corresponding structural locations 122-128 to one or more adjacent and/or non-adjacent structural locations 122-134 based on measurements (e.g., inertial measurements) and/or deflection vectors provided by other ones of the processing nodes 102-108. In the event that a processing node 102-108 fails, the surviving (e.g., operating, non-failed) example processing nodes 102-108 estimate (e.g., determine) an aeroelastic navigation state of the structural location 122-128 corresponding to the failed processing node 102-108 by: a) exchanging aeroelastic navigation states; and b) using the aeroelastic navigation states in combination with platform design data 136, a platform aeroelasticity database 138, and/or operational data 140 to estimate the aeroelastic navigation state of the structural locations 122-128 corresponding to the failed processing nodes 102-108. In some examples, a processing node 102-108 may have a failed inertial measurement unit or other sensor but have a working processor. In some such examples, processor of the processing node 102-108 may estimate the aeroelasticity at the measurement location based on the measurements of operational adjacent nodes 102-108.

In some examples, the aeroelastic navigation state further includes notifications of significant (e.g., critical) structural events, such as an aeroelasticity measurement in excess of platform structural health threshold(s) 142 (e.g., a threshold received at startup based on the design data 136). Other example notifications include suggested structural configurations that may provide better platform performance (e.g., changing to a different platform altitude, changing to a different platform speed, adjusting a wing twist, etc.).

The example data fusion node 110 is a processing node similar to the process nodes 102-108. The data fusion node 110 receives input data such as operational data and/or environmental data (e.g., avionics data) via the platform interface 118. Environmental data may include, for example, air data, temperature, atmospheric conditions, winds, and/or any other information about the external environment. Operational data may include, for example, desired cruise condition, fuel loads, and/or any other information about operation of the platform 101. Where the platform is an aircraft, the example data fusion node 110 may receive external information such as formation flight information (e.g., navigation states and/or ranges of partner aircraft in a formation flight). The data fusion node 110 receives the information via the platform interface 118 and provides the data to the other nodes 102-108, 112, 114.

The example data fusion node 110 outputs an aeroelastic navigation state, event notifications (e.g., critical event notifications), and generates and/or updates the aeroelasticity platform database 138. The example aeroelasticity platform database 138 is stored in the storage device 116 by the data fusion node 106 and includes a history of the aeroelasticity navigation states and/or navigation states for a time frame (e.g., for one or more flights and/or other platform uses). The aeroelasticity platform database 138 may be used for platform health management (e.g., detection of structural non-optimizations, detection of maintenance needs, etc.).

In some examples, the processing nodes 102-114 run an identical software program, with some portions of the software program only being active on particular nodes 102-114. In some examples, different nodes 102-114 have similar types of sensors (e.g., inertial measurement units, deflection sensors, etc.) that differ in ways such as accuracy or presence. For example, a node in a lift surface may have an inertial measurement unit and an optical strain sensor, while a node in a support structure of the platform 101 may have a higher-accuracy inertial measurement unit while omitting strain sensors.

The example data fusion node 110 formats the aeroelastic navigation state into a subset of information supplied to other platform (e.g., aircraft) systems such as the platform control system 120 (e.g., flight control). In some examples, the aeroelastic navigation state may contain more information than is released to the platform control system 120 and/or other systems because such platform systems may not need some of the information available from the data fusion node 106. The aeroelastic navigation state includes redundant aeroelastic measurements made by the processing nodes 102-108.

The aeroelasticity reference node 114 is a processing node that operates as a reference for one or more other processing nodes 102 when producing aeroelasticity measurements. While the example system 100 includes one aeroelasticity reference node 114, multiple ones of the nodes 102-114 of FIG. 1 may operate as aeroelasticity references (e.g., at an aircraft wing box, at an aircraft tail, etc.). The processing nodes 102-108 compute corresponding navigation states based on the reference data from an assigned aeroelasticity reference node (e.g., the aeroelasticity reference node 114, another node operating as an aeroelasticity reference node, etc.).

Each of the processing nodes 102-108 is assigned an aeroelasticity reference node based on a network configuration table and/or configuration rules 144 (e.g., rules loaded at startup and/or initialization of the system 100). However, the aeroelasticity reference node of any of the nodes 102-108 may change to any other node 102-110, 114 based on the network configuration table and/or configuration rules 144 if, for example, the aeroelasticity reference node 114 is determined to have failed. Because the aeroelasticity reference node 114 operates as a reference for the calculations of other processing nodes 102-108, the example aeroelasticity reference node 114 includes higher-accuracy components (e.g., a high-accuracy inertial measurement unit) compared to the processing nodes 102-108.

The navigation reference node 112 provides a reference for earth-relative navigation of the platform 101. For example, the earth-relative navigation of the platform 101 may include a reference navigation state at a center of gravity of the platform 101 (e.g., the position of the platform 101 relative to the earth, the velocity of the platform 101 relative to the earth, the altitude of the platform 101 relative to the earth, the acceleration of the platform 101, the angular rate of the platform 101, etc.). The example navigation reference node 112 determines the navigation state of the platform 101 using inertial states and avionics data. In some examples, inertial states and/or avionics data have conflicting data, in which case the conflicts are resolved according to a hierarchy. In some examples, conflicting data is identified using a distributed parity vector as described below.

In the example of FIG. 1, the navigation reference node 112 determines a navigation state based on an aeroelasticity navigation state determined by the aeroelasticity reference node 114. In some examples, the navigation reference node 112 and/or the aeroelasticity reference node 114 are located near a nominal center of gravity of the platform 101 (e.g., an estimated center of gravity based on design information and/or average platform load information). During use of the platform 101 and/or between different uses of the platform 101, the actual center of gravity of the platform 101 may change due to changes in the load of the platform 101. The navigation reference node 112 then uses avionics data, such as platform loading information, to compute (e.g., estimate) the actual center of gravity of the platform 101 relative to the aeroelasticity reference node 114 and estimates the navigation solution at the estimated center of gravity.

The center of gravity of the platform 101 may change from use to use, and/or during a use of the platform (e.g., as the platform unloads via fuel use, etc.). For example, different loads and/or different placements of a load on the platform 101 can change the actual center of gravity of the platform 101 during a given use. In some examples, the navigation reference node 112 uses the aeroelastic navigation states determined by multiple ones of the processing nodes 102-108 to compute the center of gravity of the platform 101 from the aeroelasticity reference node 114 and determine the platform navigation state at the determined center of gravity. For example, the processing nodes 102-108 compute an aeroelastic navigation state of the structural locations 122-128 with respect to the aeroelasticity reference node 114. The example navigation reference node 112 processes the aeroelastic navigation states for the corresponding structural locations 122-128 and the platform loading information to determine (e.g., approximate) a platform navigation state corresponding to the center of gravity of the platform 101. In some examples, the navigation reference node 112 uses a distributed weighted least-squares method with historical aeroelasticity data and/or structural design data 136 to determine the platform navigation state at the center of gravity.

The example data fusion node 110 generates and updates a platform aeroelasticity database 138 using aeroelastic navigation states (e.g., aeroelasticity measurements, deflection measurements, etc.) from the nodes 102-114. In some examples, the data fusion node 110 generates the platform aeroelasticity database 138 in real time. The platform aeroelasticity database 138 is stored in the storage device 116 and includes the aeroelastic state of the platform 101 at measured conditions over time. The platform aeroelasticity database 138 data provides a reference for structural health and aging, and may be used for subsequent operation of the example system 100. For example, the data included in the platform aeroelasticity database 138 may be downloaded from the storage device and/or from the data fusion node 110 and post-processed after use of the platform 101. Example post-processing may include comparing the data against design data 136 for the platform 101 to evaluate platform aging, to identify maintenance to be performed on the platform 101, and/or to set thresholds for structural events (e.g., critical structural events) such as twists of at least a threshold magnitude at the structural locations. In some examples, the information stored in the platform aeroelasticity database 138 pertains to measurements at selected cruise conditions, structural events, and the like, such that the generated structural history of the platform 101 is a relevant subset of the real-time measurements throughout the flight. The structural history in the platform aeroelasticity database is used in post-flight processing to determine aircraft performance and for structural health and maintenance purposes.

An example use of the system 100 of FIG. 1 is an installation of the system 100 in an airframe of an aircraft. To install the system 100 in an airframe, the example nodes 102-114 are related to a coordinate frame or desired reference frame of the airframe, such as a wing chord line or wing box. The example installation of the system 100 further includes a ground-align gyrocompass procedure, and final compensation of the nodes 102-114 following a first flight of the aircraft to remove residual azimuth error resulting from the ground installation procedure(s).

Upon a startup of the example system, the data fusion node 110 loads a platform aeroelasticity database 138 (e.g., from the storage 116). In some examples, the platform aeroelasticity database 138 includes design data 136 for the platform 101. The platform aeroelasticity database 138 is updated based on collected aeroelasticity records of each use of the platform 101. The example data fusion node 110 also loads a network configuration table and/or configuration rules 144 that determine the configuration of the system 100 (e.g., the roles and/or tasks to be performed by each of the nodes 102-114) and platform structural health thresholds 142. The platform structural health thresholds 142 are derived from the platform aeroelasticity database 138 and aeroelastic limits for the structure, which are based initially on design data 136 and are updated based on platform use data (e.g., aeroelastic navigation states). Accordingly, the example platform aeroelasticity database 138 evolves over multiple uses of the platform 101.

When the platform 101 is in use, the example data fusion node 110 generates the aeroelastic navigation state of the platform 101 (e.g., in real-time). Each of the example processing nodes 102-108 continuously integrates aeroelastic navigation states of the respective structural locations 122-128, estimates the aeroelasticities of the structural locations 122-128 with respect to the aeroelasticity reference node 114, and estimates the aeroelasticities of the structural locations 122-128 with respect to other processing nodes 102-108 to generate a redundant set of aeroelasticity measurements. To generate the aeroelastic navigation states, the example processing nodes 102-108 perform inertial measurements for the structural locations and also perform deflection measurements. The aeroelastic navigation states are compiled into the platform navigation state and processed by the data fusion node 110 into an output to the avionics systems (e.g., via the platform interface 118). The platform navigation state (and, thus, the aeroelastic navigation states) may be used to enhance control of the platform 101.

In examples where the platform 101 is an aircraft, the data fusion node 110 further collects avionics data and available information from offboard sources on environmental conditions (e.g., weather conditions). The environmental conditions may include weather conditions at multiple altitudes along a planned and/or actual flight path. The avionics data and offboard information are distributed to the nodes 102-108, 112, 114. The example processing nodes 102-108 compute respective aeroelastic navigation states based on the avionics data and/or the offboard information and the navigation reference node 112 computes a navigation state based on the based on the avionics data and/or the offboard information. The data fusion node 110 analyzes the current platform conditions in view of the current aeroelastic navigation state and platform aeroelasticity database 138 to determine advantageous (e.g., optimal) structural conditions for the platform 101 and/or to provide notifications of potential improvements.

The platform aeroelasticity database 138 may be downloaded and/or made available for post-flight processing into the platform aeroelasticity database 138, through which a structural record of the platform 101 is developed and maintained over time. From the platform aeroelasticity database 138, the platform structural health thresholds 142 may be determined and set for future flights.

In the event of a sensor failure during use of the platform 101, or another event affecting the system 100, the nodes 102-114 use the network configuration table and/or configuration rules 144 to reconfigure the nodes 102-114 and/or to remove a faulty sensor or node 102-114, and to maintain the aeroelastic navigation state without interruption. In some examples, the data fusion node 110 notifies the platform control system 120 of the event.

The example platform navigation state generated by the data fusion node 110 includes a composite state of the structure of the platform (e.g., an airframe) that includes the traditional earth-relative point navigation state at the center of gravity of the platform 101, the aeroelasticity of the various structural locations 122-138 with respect to their aeroelasticity references and/or to each other, and a list of any recommended actions the platform control system 120 may use to improve the platform navigation state to a higher performance set of conditions. Higher performance may include, for example, improved fuel efficiency, improved power management, and/or a control action to alleviate a stress on the platform 101 that exceeds a platform structural health threshold 142. The platform control system 120 may use the notifications and/or the platform navigation state to form active control commands for the platform 101, such as for lift surfaces and structure on an aircraft. In some examples, the fusion node 110 may notify (e.g., via the platform control system 120) the pilot of events or conditions such as a list of options for increased performance that a pilot may consider, failure notifications, or any other relevant information determined from the platform navigation state.

Figure 2:
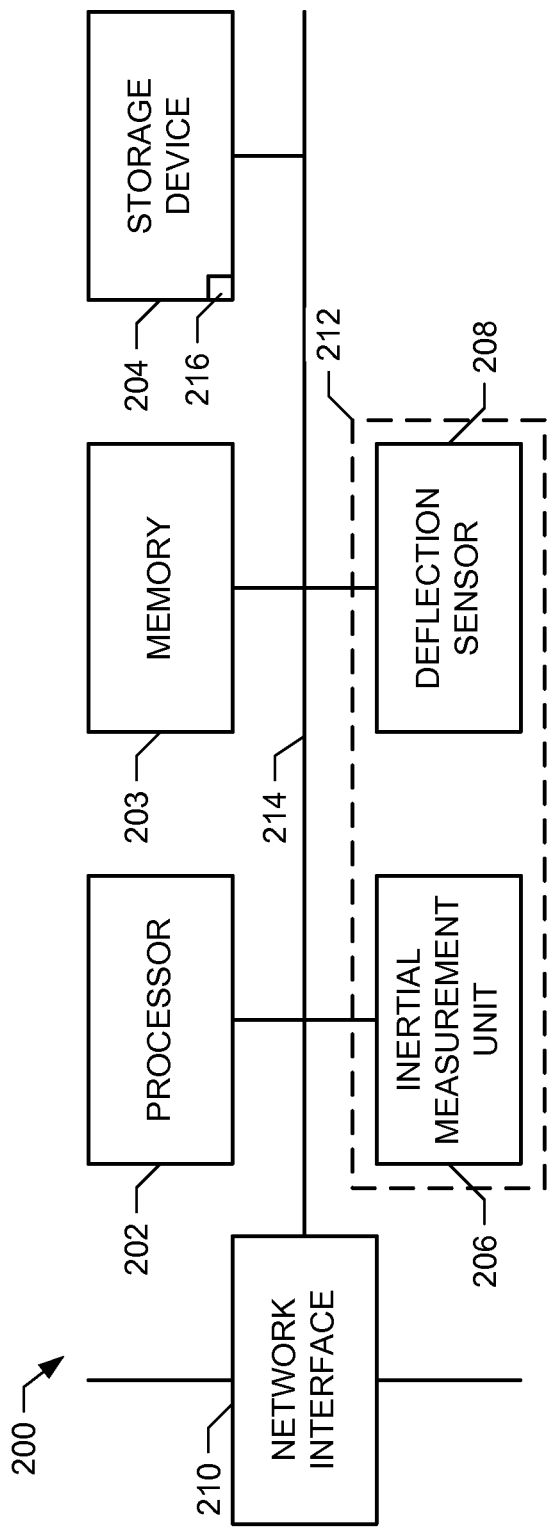
FIG. 2 is a block diagram of an example processing node that may be used to implement any of the processing nodes of FIG. 1.

FIG. 2 is a block diagram of an example processing node 200 that may be used to implement any of the nodes 102-114 of FIG. 1. The example processing node 200 of FIG. 2 includes a processor 202, a memory 203, a storage device 204, an inertial measurement unit 206, a deflection sensor 208, and a network interface 210. The example processing node 200 is associated with a structural location 212 of a platform (e.g., the platform 101 of FIG. 1, an aircraft). In the example of FIG. 2, the processor 202, the memory 203, the storage device 204, the inertial measurement unit 206, the deflection sensor 208, and the network interface 210 are communicatively coupled via a communications bus 214.

The example processor 202 of FIG. 2 executes computer readable instructions 216 stored on a tangible computer readable medium, such as the memory 203 and/or the storage device 204. The processor 202 can be implemented by one or more microprocessors, controllers, and/or logic circuits. In the example of FIG. 2, the processor 202 obtains measurements, such as inertial measurements from the inertial measurement unit 206 and/or deflection measurements from the deflection sensor 208 and generates an aeroelastic navigation state of the structural location 212. The aeroelastic navigation state describes the state of the structural location 212 with respect to the Earth and/or with respect to other locations on the structure of the platform 101 (e.g., particular structural locations associated with other processing nodes). The processor 202 stores determined aeroelastic navigation states in the memory 203 and/or in the storage device 204 and/or transmits the aeroelastic navigation states to other processing nodes via the network interface 210.

The memory 203 (e.g., a cache, volatile memory, and/or non-volatile memory) may be implemented by Synchronous Dynamic Random Access Memory (SDRAM), Dynamic Random Access Memory (DRAM), RAMBUS Dynamic Random Access Memory (RDRAM), flash memory and/or any other desired type of volatile and/or non-volatile memory device. Access to the memory 203 is controlled by a memory controller.

The example storage device 204 may be implemented by floppy disk drives, hard drive disks, compact disk drives, digital versatile disk (DVD) drives, solid state storage drives, and/or any other types of storage.

The example memory 203 and/or the example storage device 204 of FIG. 2 store computer readable instructions 216 to be executed by the processor 202. In some examples, the computer readable instructions 216 include instructions for the processor 202 to perform as one or more of a processing node (e.g., the processing nodes 102-108 of FIG. 1), as a data fusion node (e.g., the data fusion node 110 of FIG. 1), as a navigation reference node (e.g., the navigation reference node 112 of FIG. 1), and/or as an aeroelasticity reference node (e.g., the aeroelasticity reference node 114 of FIG. 1). The example instructions 216 further include configuration instructions to enable or disable functions (e.g., data fusion node functions, navigation reference node functions, and/or aeroelasticity reference node functions) to enable the processor 202 to perform and/or not perform particular functions based on, for example, the states of other nodes in an aeroelasticity measurement system of which the processing node 200 is a part.

The inertial measurement unit 206 of FIG. 2 performs inertial measurements of the structural location 212. In the example of FIG. 2, inertial measurements include measurements of the velocity of the structural location 212, the acceleration of the structural location 212, gravitational forces on the structural location 212, angular velocity of the structural location 212, and/or an orientation of the structural location 212. One or more of the velocity of the structural location 212 and/or the orientation of the structural location 212 may additionally or alternatively be derived by the processor 202 based on other measurements provided by the inertial measurement unit 206. In the event of a failure of inertial measurement unit 206, the example processor 202 may estimate, based on aeroelasticity measurements of adjacent nodes and design data, the probable aeroelasticity at the structural location 212 corresponding to the inertial measurement unit 206. In such examples, the adjacent node(s) that calculate the probable aeroelasticity of the structural location 212 note (e.g., in the network navigation state) that the solution provided for the structural location 212 is an estimate rather than direct measurement. The example data fusion node 110 may then weight the measurement appropriately. In some examples, the inertial measurement unit 206 is attached (e.g., affixed, mechanically coupled, etc.) to the structural location 212. The inertial measurement unit 206 of FIG. 2 may be, for example, an HG1700 Inertial Measurement Unit or an HG9900 Inertial Measurement Unit, both being commercially available from Honeywell International, Inc. However, other types of inertial measurement units may alternatively be used. In the example of FIG. 2, the processor 202 uses strapdown navigation techniques to calculate at least a portion of the aeroelastic navigation state based on the inertial measurements.

The example deflection sensor 208 of FIG. 2 determines a deflection occurring at the structural location 212, extending from the structural location 212, and/or otherwise associated with the structural location 212. In the example of FIG. 2, the deflection sensor 208 includes a fiber Bragg grating sensor extending from a first location on the structure of the platform 101 (e.g., a leading edge of an aircraft wing) to a second location on the structure of the platform 101 (e.g., a trailing edge of the aircraft wing), where both the first location and the second location may be considered part of the structural location 212. In some such examples, the fiber Bragg grating sensor extends along a chord line of the aircraft wing from the first location to the second location. Other types of deflection sensors may additionally or alternatively be used. The example deflection sensor 208 measures an amount of deflection occurring between the first location and the second location and provides the measurement to the processor 202. The example processor 202 uses the deflection sensor to determine the aeroelastic navigation state of the structural location 212. The example inertial measurement unit 206 provides a stable altitude and position reference for the deflection sensor 208 so that deflection can be referenced to a desired structural point such as the structural location 212.

The example network interface 210 of FIG. 2 communicatively couples the processing node 200, including the processor 202 and the storage device 204, to other nodes in an aeroelasticity navigation system. The network interface 210 may be implemented by any type of interface standard, such as an Ethernet interface, a universal serial bus (USB), and/or a PCI express interface. The example processor 202 and/or the storage device 204 may transmit and/or receive aeroelastic navigation states, inertial and/or deflection measurement information, configuration information, navigation state information, data fusion information, aeroelasticity reference information, and/or any other information to be exchanged between one or more nodes in the system.

Figure 3:
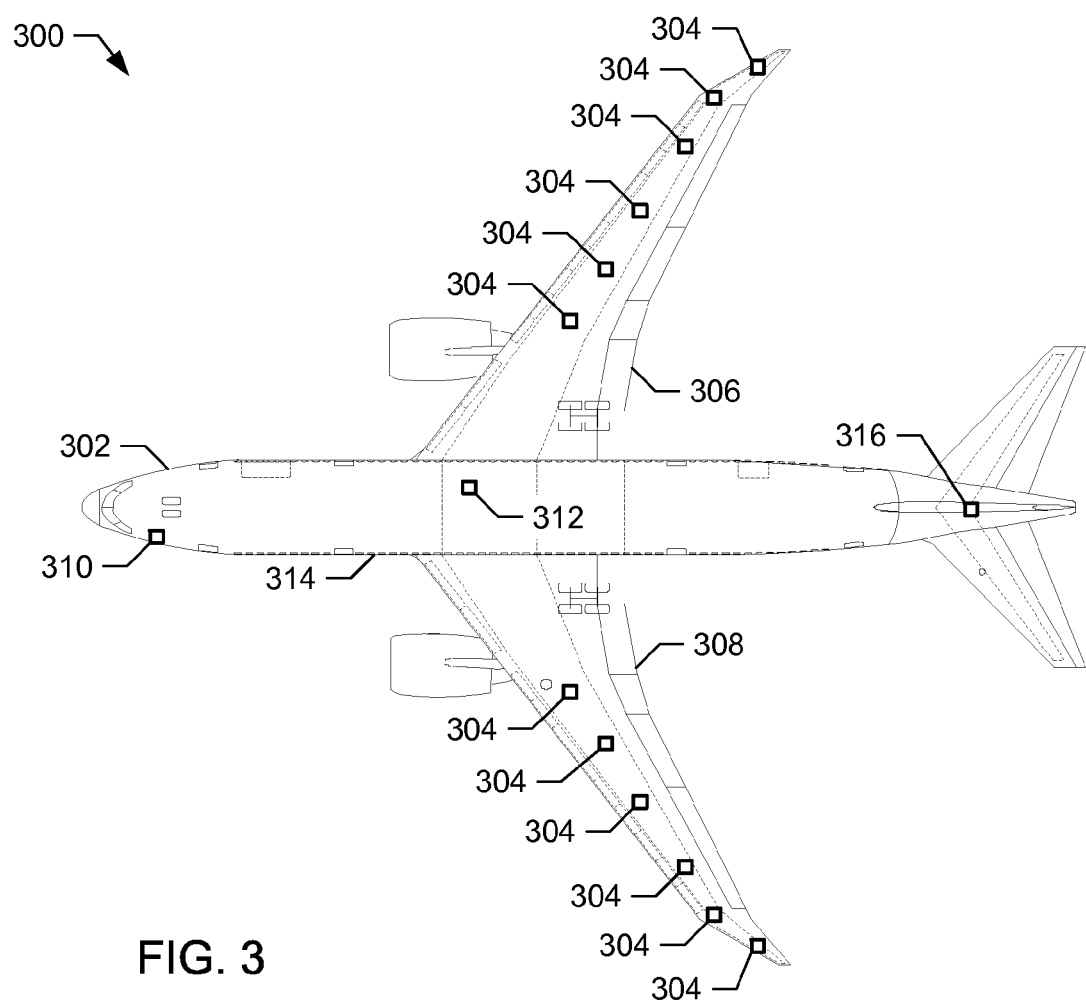
FIG. 3 is an arrangement of an example network of processing nodes installed in an example platform to determine a navigation state of the platform.

FIG. 3 is a diagram of an example network 300 of processing nodes installed in an example platform 302 to determine a navigation state of the platform 302. The example platform 302 of FIG. 3 is an aircraft. Multiple identical processing nodes 304 are positioned at respective locations on wings 306, 308 of the example aircraft 302. In the illustrated example, the processing nodes 304 are located in mirror positions, but may alternatively have a different arrangement.

The example network 300 of FIG. 3 further includes a forward processing node 310, an aeroelasticity reference node 312 in a fuselage 314, and an aft processing node 316. The example forward processing node 310 and the example aeroelasticity reference node 312 of FIG. 3 include higher-accuracy inertial measurement units (e.g., HG9900 Inertial Measurement Units) than are included in the nodes 304 and the aft processing node 316 (HG1700 Inertial Measurement Units). In an example default configuration of the network 300, the example forward processing node 310 of FIG. 3 functions as a navigation reference node (e.g., the navigation reference node 112 of FIG. 1) and as a data fusion node (e.g., the data fusion node 110 of FIG. 1), and the aeroelasticity reference node 312 functions as an aeroelasticity reference node (e.g., the aeroelasticity reference node 114 of FIG. 3). However, any other default configuration may be used, and the configuration of the network 300 may be modified in response to one or more events (e.g., when one or more nodes 304, 310, 312, 316 fails).

Figure 4:
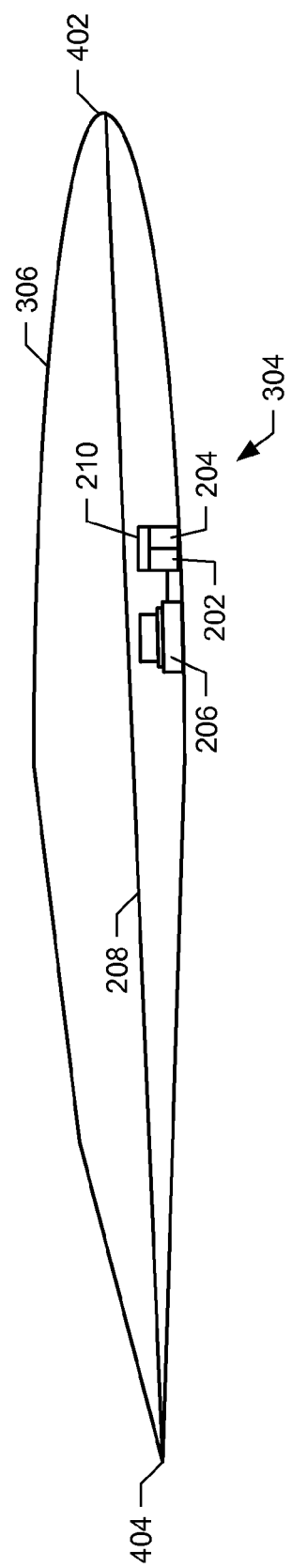
FIG. 4 is a cross-sectional view of one of the aircraft wings of FIG. 3 including a processing node.

FIG. 4 is a cross-sectional view of one of the aircraft wings 306, 308 of FIG. 3 including a processing node 304. The example processing node 304 includes the example processor 202, the example storage device 204, the example inertial measurement unit 206, the example deflection sensor 208, and the example network interface 210 of FIG. 2.

The example inertial measurement unit 206 and the example deflection sensor 208 are aligned along the cross-section of the example wing 306. The inertial measurement unit 206 is affixed to a position on structure of the wing 306 and provides inertial measurements representative of the affixed position. The example deflection sensor 208 is a fiber Bragg grating sensor embedded in the structure of the example wing 306 along the chord line of the wing 306 at the illustrated cross-section. As the wing 306 deflects from a leading edge 402 to a trailing edge 404 of the wing 306, the example deflection sensor 208 provides a measure of the deflection to the example processor 202. In some examples, the deflection sensor 208 and/or the processor 202 include devices to determine the corresponding deflection based on optical signals provided by a fiber Bragg grating sensor.

While an example manner of implementing the nodes 102-114 of FIG. 1 has been illustrated in FIG. 2, one or more of the elements, processes and/or devices illustrated in FIG. 2 may be combined, divided, re-arranged, omitted, eliminated and/or implemented in any other way. Further, the example processor 202, the example memory 203, the example storage device 204, the example inertial measurement unit 206, the example deflection sensor 208, the example network interface 210 and/or, more generally, the example nodes 102-114 and 200 of FIGS. 1 and/or 2 may be implemented by hardware, software, firmware and/or any combination of hardware, software and/or firmware. Thus, for example, any of the example processor 202, the example memory 203, the example storage device 204, the example inertial measurement unit 206, the example deflection sensor 208, the example network interface 210 and/or, more generally, the example nodes 102-114 and 200 of FIGS. 1 and/or 2 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example processor 202, the example memory 203, the example storage device 204, the example inertial measurement unit 206, the example deflection sensor 208, the example network interface 210, the example processing nodes 102-108, the example data fusion node 110, the example navigation reference node 112, the example aeroelasticity reference node 114, the example storage device 116, and/or the example platform interface 118 are hereby expressly defined to include a tangible computer readable medium such as a memory, DVD, CD, Blu-ray, etc. storing the software and/or firmware. Further still, the example nodes 102-114, 200 of FIGS. 1 and/or 2 may include one or more elements, processes and/or devices in addition to, or instead of, those illustrated in FIGS. 1 and 2, and/or may include more than one of any or all of the illustrated elements, processes and devices.

Flowcharts representative of example methods that may be used to implement the example nodes 102-114, 200 of FIGS. 1 and/or 2 are shown in FIGS. 5-11. In this example, the methods may be implemented using instructions that comprise a program for execution by a processor such as the processor 202 shown in the example processing node 200 discussed above in connection with FIG. 2. The program may be embodied in software stored on a tangible computer readable medium such as a CD-ROM, a floppy disk, a hard drive, a digital versatile disk (DVD), a Blu-ray disk, or a memory associated with the processor 202, but the entire program and/or parts thereof could alternatively be executed by a device other than the processor 202 and/or embodied in firmware or dedicated hardware. Further, although the example program is described with reference to the flowcharts illustrated in FIGS. 5-11, many other methods of implementing the example nodes 102-114, 200 may alternatively be used. For example, the order of execution of the blocks may be changed, and/or some of the blocks described may be changed, eliminated, or combined.

As mentioned above, the example methods of FIGS. 5-11 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 5:
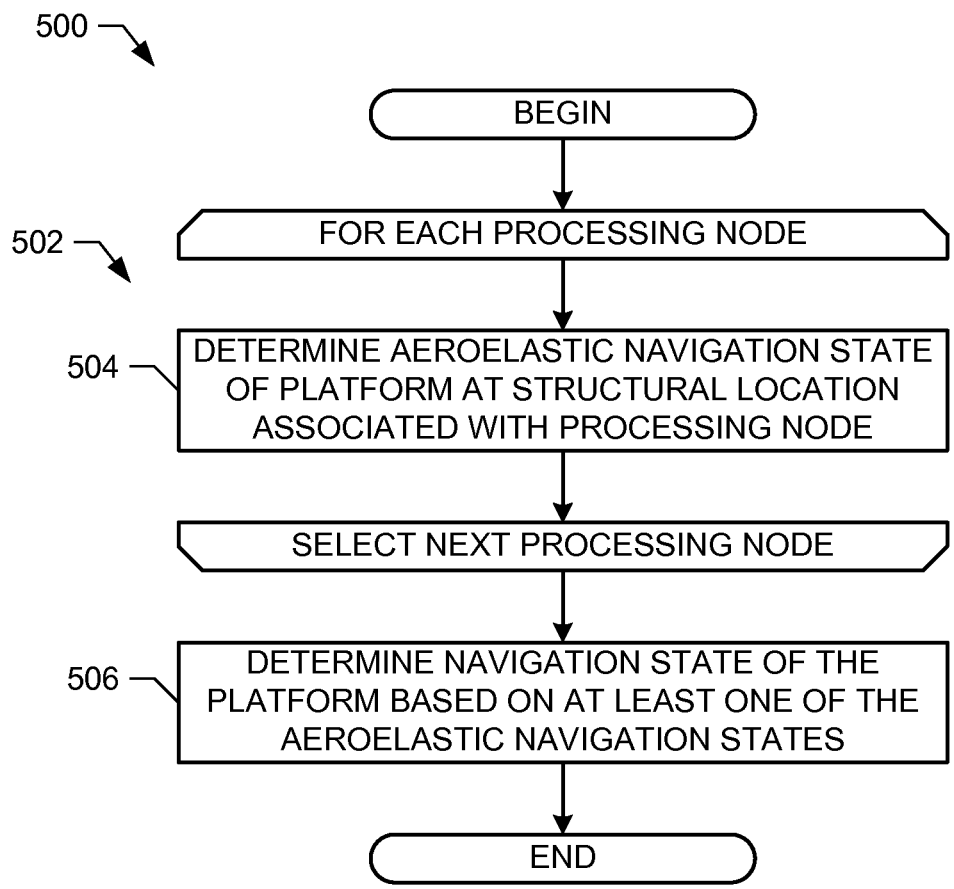
FIG. 5 is a flowchart representative of an example method to determine a navigation state of a platform.

FIG. 5 is a flowchart representative of an example method 500 to determine a navigation state of a platform. The example method 500 may be used to implement the example system 100 of FIG. 1 to determine a navigation state of the platform 101 of FIG. 1.

The example system 100 performs a loop 502 for each processing node 102-108 in the example system 100. For each processing node 102-108, the example processing node 102-108 determines an aeroelastic navigation state of the platform 101 at a structural location 122-128 associated with the processing node 102-108 (block 504). In some examples, one or more of the processing nodes 102-108 determines the aeroelastic navigation state consisting of the corresponding structural location 122-128 relative to the earth as well as relative to an aeroelasticity reference node such as 114 of FIG. 1. When each processing node has performed block 504, the example data fusion node 110 determines a platform navigation state based on at least one of the aeroelastic navigation states (block 506). The example method 500 may then end and/or iterate to determine additional platform navigation states.

While the example method 500 illustrates the loop 502 as a sequence, block 504 of the example loop 502 may additionally or alternatively be performed in time-synchronization (e.g., in parallel) for any combination of the processing nodes 102-108. Additionally, block 506 may be performed by any node 102-114 that has been configured to function as the data fusion node 110 (e.g., if the data fusion node 110 fails, etc.).

Figure 6:
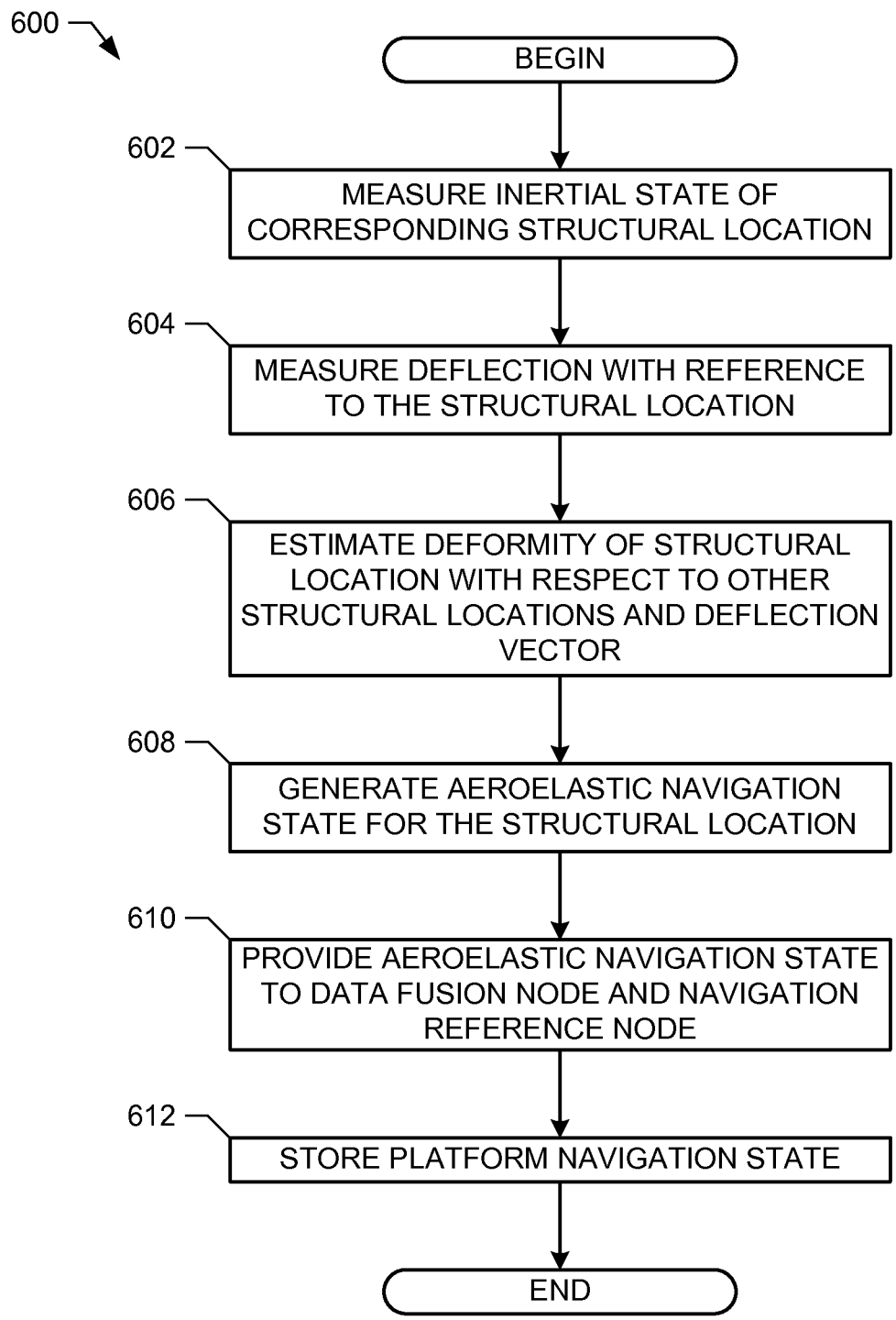
FIG. 6 is a flowchart representative of an example method to determine an aeroelastic navigation state of a structural location of a platform and store a platform navigation state.

FIG. 6 is a flowchart representative of an example method 600 to determine an aeroelastic navigation state of a structural location of a platform. The example method 600 may be performed by any of the example processing nodes 102-108 of FIG. 1 to implement block 504 of FIG. 5 to determine an aeroelastic navigation state of the structural locations 122-128 of the example platform 101 of FIG. 1. The example method 600 of FIG. 6 is described below with reference to the processing nodes 102 and 200 of FIG. 2.

The example method 600 of FIG. 6 begins by measuring (e.g., via the processor 202 and/or the inertial measurement unit 206) an inertial state of a corresponding structural location 122, 212 (block 602). For example, the processor 202 may receive inertial measurement data from the inertial measurement unit 206 and determine an inertial state of the structural location 122, 212. The inertial state may include, for example, the speed of the structural location 122, 212, the angular velocity of the structural location 122, 212, the acceleration of the structural location 122, 212, and/or the orientation of the structural location 122, 212.

The example processor 202 generates a deflection vector with reference to the structural location 122, 212 (block 604). For example, the processor 202 may receive deflection measurement data from the deflection sensor 208, which may be implemented as a fiber Bragg grating sensor and/or any other type of deflection sensor. The example processor 202 estimates a deformity of the structural location 212 with respect to other structural locations (e.g., the structural locations 122-128) based on the aeroelastic navigation states and the deflection vector (block 606). For example, the processor 202 may estimate the twist and/or bend of the structural location 212 with respect to one or more structural locations adjacent the structural location 212.

The example processor 202 generates an aeroelastic navigation state for the structural location 122, 212 (block 608). The aeroelastic navigation state may include, for example, the speed of the structural location 212, the angular velocity of the structural location 212, and/or the orientation of the structural location 212. In some examples, the aeroelastic navigation state includes an earth-relative navigation solution of the structural location 212. In the example of FIG. 6, the aeroelastic navigation state is based on the inertial state and the deflection vector. The example processor 202 of FIG. 2 determines the aeroelastic navigation state for the structural location 212 with respect to an assigned aeroelasticity reference node such as the aeroelasticity reference node 114 of FIG. 1 and/or with respect to one or more other processing nodes 104-108. For example, a processing node 102 associated with a structural location on a wing of an aircraft measures twist of the wing relative to an aeroelasticity reference node referenced to a wing-box structural location. The example processor 202 provides the aeroelastic navigation state to the data fusion node 110 and/or to the navigation reference node 112 (block 610). For example, the processor 202 may provide the aeroelastic navigation state of the structural location 212. In some examples, the processor 202 further provides the deflection vector and/or the estimated deformity.

The processor 202 stores a platform navigation state (block 612). For example, the processor 202 may receive the platform navigation state determined by the data fusion node 110. The processor 202 stores the platform navigation state in the example storage 204. The platform navigation state may include aeroelastic navigation states of one or more of the processing nodes 102-108, the navigation state for the center of gravity for the platform 101, and/or any other information to be stored at the processing node 200. The example method 600 may then end and/or iterate to determine additional aeroelastic navigation states and/or platform navigation states.

Figure 7:
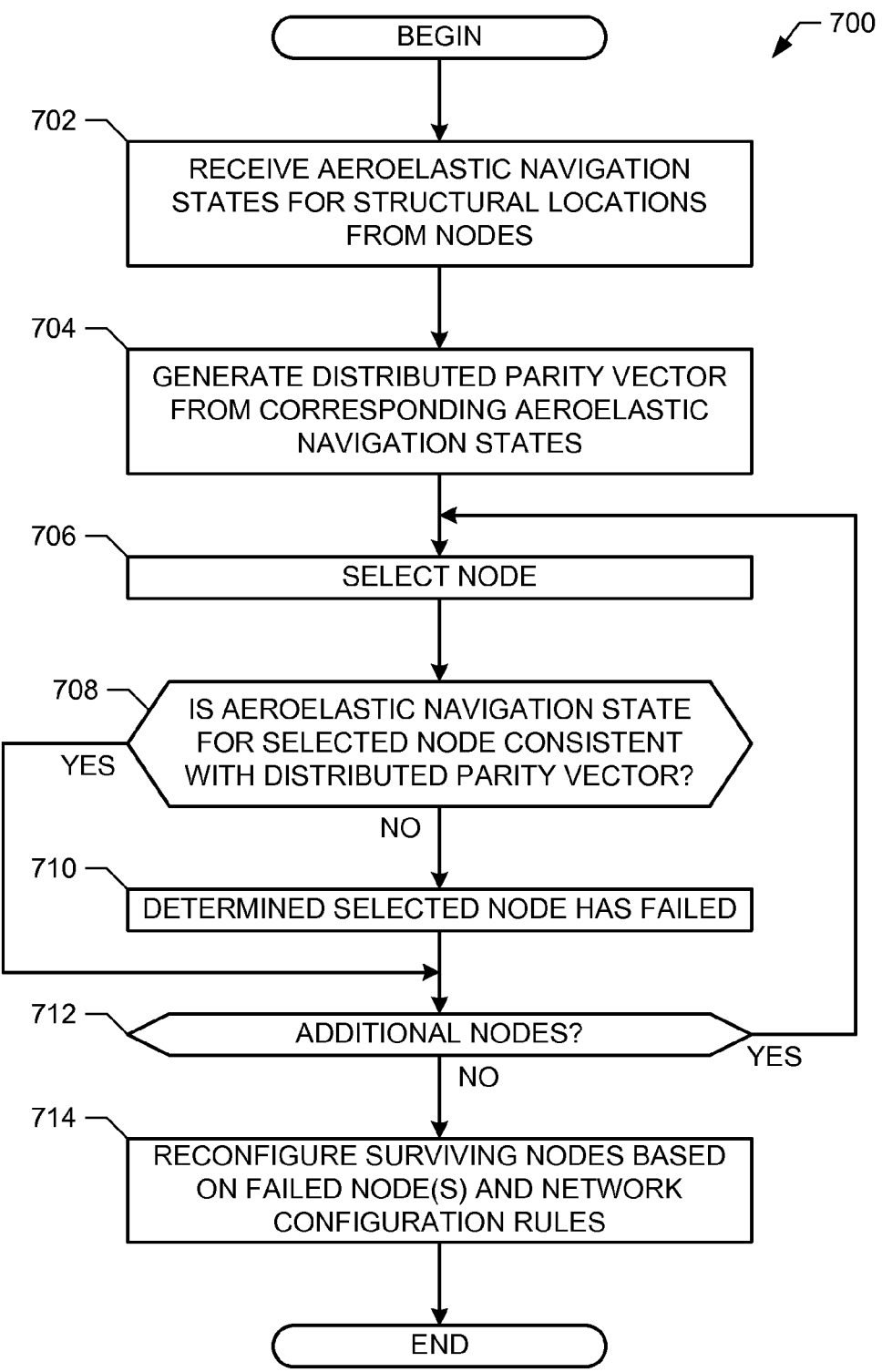
FIG. 7 is a flowchart representative of an example method to identify a failure in a processing node.

FIG. 7 is a flowchart representative of an example method 700 to identify a failure in a processing node. The example method 700 may be performed by any of the nodes 102-114 of FIG. 1 but, by way of example only, will be described below as being performed by the example data fusion node 110.

The example method 700 begins by receiving aeroelastic navigation states for structural locations 122-134 of the platform 101 from the nodes 102-114 (block 702). In some examples, the data fusion node 110 receives the aeroelastic navigation states substantially in real-time from the processing nodes 102-108. The data fusion node 110 generates a distributed parity vector from corresponding ones of the aeroelastic navigation states (block 704). In the example of FIG. 7, corresponding ones of the aeroelastic navigation states include simultaneous or substantially simultaneous (e.g., time-synchronized) aeroelastic navigation states. The distributed parity vector may include, for example, one or more vectors representative of a state of the platform 101 as constructed from the corresponding ones of the aeroelastic navigation states, a navigation state for the center of gravity, design data 136 for the platform 101, a platform aeroelasticity database 138, and/or any other information for constructing a distributed parity vector for the platform 101.

The example data fusion node 110 selects a node 102-114 (block 706) (e.g., the processing node 102) and determines whether the aeroelastic navigation state for the selected node 102 is consistent with the distributed parity vector (block 708). In some examples, the selected node 102-108 is consistent with the parity vector if the aeroelastic navigation state of the selected node has less than a threshold deviation from an expected aeroelastic navigation state based on the parity vector. If the aeroelastic navigation state for the selected node 102 is not consistent with the distributed parity vector (block 708), the example data fusion node 110 determines that the selected node 102 has failed (block 710).

After determining the selected node 102 has failed (block 710), or if the aeroelastic navigation state for the selected node 102 is consistent with the distributed parity vector (block 708), the example data fusion node 110 determines whether there are additional nodes to be selected (block 712). If there are additional nodes (block 712), control returns to block 706 to select another node.

If there are no additional nodes to be selected (e.g., all nodes 102-114 have been selected and evaluated) (block 712), the example data fusion node 110 (or another node 102-108, 112, 114 if the data fusion node 110 has failed) reconfigures the surviving (e.g., non-failed nodes) based on the failed node(s) and the network configuration table and/or configuration rules 144 (block 714). For example, one or more of the processing nodes 102-108, the data fusion node 110, the navigation reference node 112, and/or the aeroelasticity reference node 114 are assigned to perform additional functions based on one or more of the data fusion node 110, the navigation reference node 112, and/or the aeroelasticity reference node 114 being determined as failed. The example method 700 may then end and/or iterate to identify any additional failures in the nodes 102-114.

Figure 8:
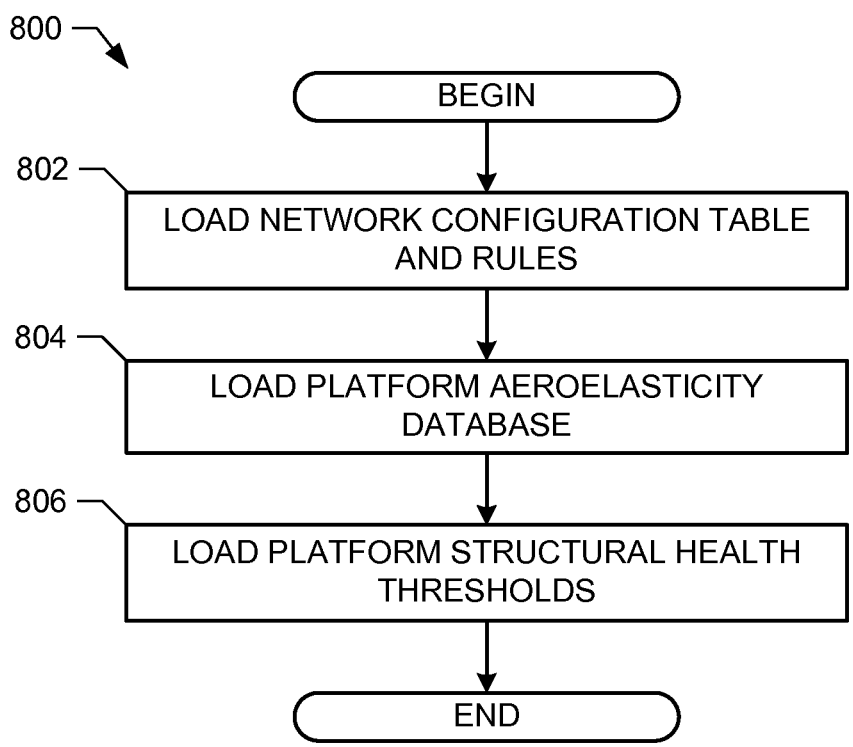
FIG. 8 is a flowchart representative of an example method to initialize an aeroelasticity measurement system.

FIG. 8 is a flowchart representative of an example method 800 to initialize an aeroelasticity measurement system. The example method 800 of FIG. 8 may be performed by any of the example nodes 102-114 of FIG. 1 to initialize and/or configure the nodes 102-114 (e.g., prior to performing aeroelasticity measurements and/or determining navigation states of the platform 101).

The example method 800 begins by loading (e.g., downloading and/or storing in a memory, reading from a memory, etc.) a network configuration table and/or configuration rules 144 (block 802). For example, the network configuration table and/or configuration rules 144 provide information regarding the nodes 102-114 and their respective structural locations 122-134. The network configuration table and/or configuration rules 144 further provide information regarding default and/or backup assignments to the nodes 102-114 of data fusion node functions, navigation reference node functions, and/or aeroelasticity reference node functions. The network configuration table may be provided to the aeroelasticity measurement system 100 (e.g., to each of the nodes 102-114) prior to a first startup and/or initialization of the system 100 and then loaded from a storage or memory for subsequent startups and/or initializations.

The example nodes 102-114 load a platform aeroelasticity database (e.g., the platform aeroelasticity database 138 of FIG. 1) (block 804). The platform aeroelasticity database 138 includes, for example, historical aeroelasticity measurements and/or historical aeroelastic navigation states for the platform 101. In some examples, the nodes 102-114 receive (e.g., load) the platform aeroelasticity database 138 from the data fusion node 110, which maintains the platform aeroelasticity database 138 for the system 100. In some other examples, each of the nodes 102-114 maintains a platform aeroelasticity database 138 that includes information relating to the entire system 100 and/or information relating to the corresponding structural location 122-134 of the respective node 102-114.

The example nodes 102-114 load platform structural health thresholds (e.g., the platform structural health thresholds 142 of FIG. 1) (block 806). The platform structural health thresholds 142 may be based on design data 136, testing data, and/or simulation data for the platform 101. In some examples, the platform structural health thresholds 142 are stored and/or maintained by the data fusion node 110. The example method 800 may then end.

Figure 9:
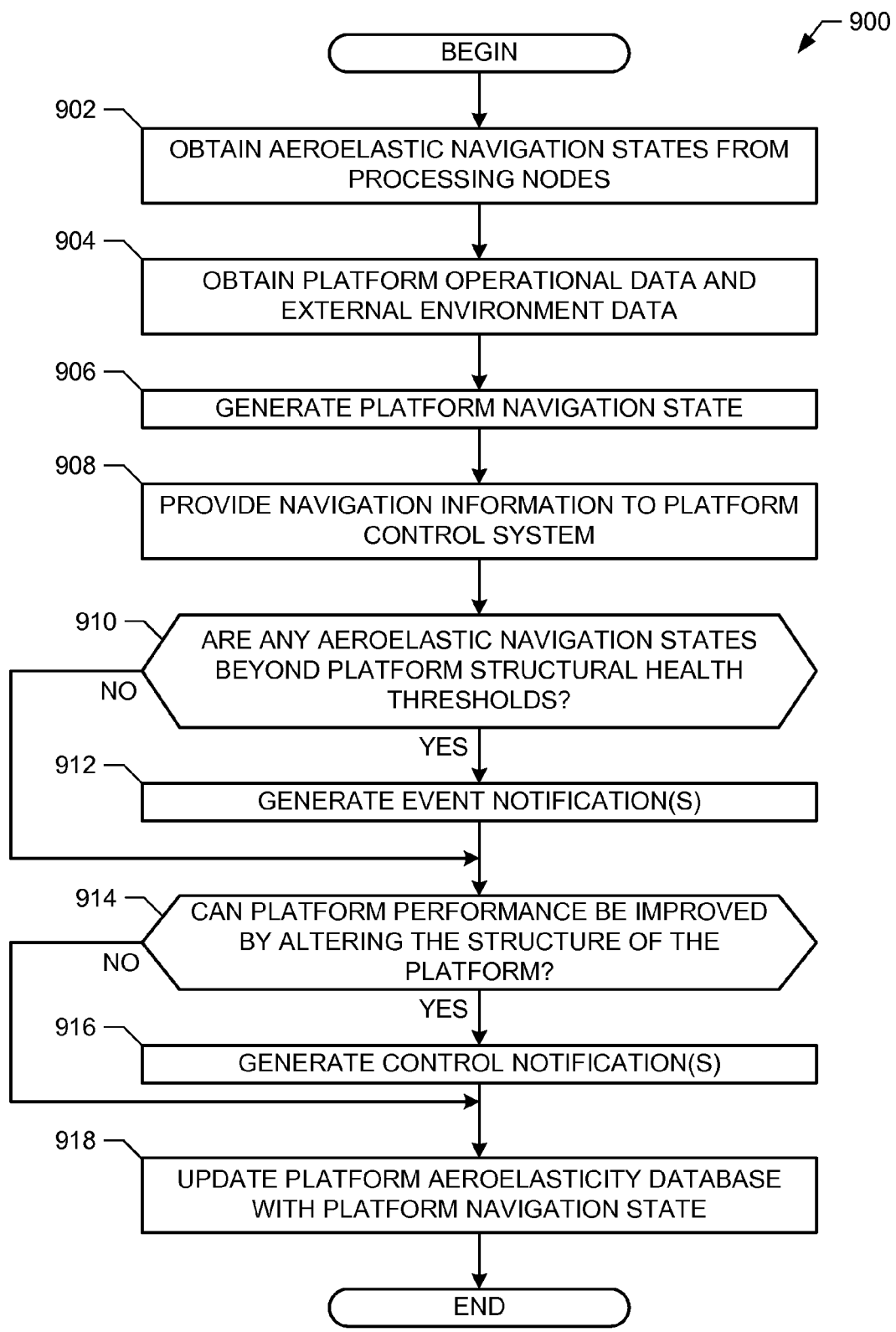
FIG. 9 is a flowchart representative of an example method to provide aeroelasticity and/or navigation information to a control system of a platform.

FIG. 9 is a flowchart representative of an example method 900 to provide aeroelasticity and/or navigation information to a structural control system of a platform. The example method 900 may be performed by the data fusion node 110 and/or the platform interface 118 of FIG. 1 to, for example, provide platform navigation states and/or aeroelasticity information to the platform control system 120 for the platform 101 of FIG. 1.

The example method 900 begins by obtaining (e.g., at the data fusion node 110) aeroelastic navigation states from the processing nodes 102-108 (block 902). For example, the processing nodes 102-108 and/or the aeroelasticity reference node 114 may transmit the respective aeroelastic navigation states to the data fusion node 110. The data fusion node 110 also obtains platform operational data 140 and external environment data (block 904). For example, the platform operational data 140 and/or the external environment data may be obtained from the platform control system 120 and/or other sensors on the platform 101 via the platform interface 118.

The example data fusion node 110 generates a platform navigation state (block 906). In the example of FIG. 9, the platform navigation state is time-stamped and describes the speed of the platform 101 (e.g., relative to the Earth), the position of the platform 101 (e.g., relative to the Earth), the altitude of the platform 101 (e.g., relative to the Earth), acceleration of the platform 101, angular velocity of the platform 101, bend of the structure of the platform 101 (e.g., bend between the structural locations 122-134), and/or twist of the structure of the platform 101 (e.g., deflection of the platform 101 measured with reference to the structural locations 122-134). In other examples, additional information is included in the platform navigation state and/or one or more of the above elements are omitted from the platform navigation state.

The example data fusion node 110 provides navigation information to a platform control system (e.g., the platform control system 120, via the platform interface 118) (block 908). For example, the data fusion node 110 may provide the time-stamped speed, position, altitude, acceleration, and/or angular velocity of the platform 101 to the platform control system 120 for presentation of navigation information to an operator of the platform 101.

The data fusion node 110 determines whether there are any aeroelastic navigation states that traverse (e.g., go beyond) platform structural health thresholds 142 (block 910). For example, if the bend and/or twist between structural locations 122-134 may exceed a bend and/or twist health threshold 142 for those structural locations 122-134. Platform structural health thresholds 142 may be different for and/or between different ones of the structural locations 122-134, and/or may be different based on operating conditions and/or environmental conditions. Furthermore, the data fusion node 110 may infer or derive other structural properties based on the aeroelastic navigation states and compare such structural properties to platform structural health thresholds 142. If any aeroelastic navigation states (and/or properties derived from the aeroelastic navigation states) exceed platform structural health thresholds 142 (block 910), the example data fusion node 110 generates appropriate event notification(s) (block 912).

After generating the event notifications (block 912), or if the aeroelastic navigation states (and/or properties derived from the aeroelastic navigation states) do not exceed platform structural health thresholds 142 (block 910), the example data fusion node 110 determines whether platform performance can be improved by altering the structure of the platform 101 (block 914). In the example of FIG. 9, the data fusion node 110 compares the platform navigation state, operational data 140, and/or environmental data to past platform navigation states, operational data 140, and/or environmental data in the platform aeroelasticity database 138 and/or to platform design data 136. For example, the data fusion node 110 may determine that a prior structural configuration of the platform 101 resulted in improved performance in similar operating conditions and similar environmental conditions compared to the present structural configuration of the platform 101. If the data fusion node 110 determines that platform performance can be improved (block 914), the example data fusion node 110 generates appropriate control notification(s) (block 916). In some examples, the control notification(s) include notification(s) to the operator of the platform 101 via the platform interface 118. In some other examples, the control notification(s) include notification(s) to a platform control system 120 to cause the platform control system 120 to automatically (e.g., without operator input, with operator verification, etc.) change a structural configuration of the platform 101.

After generating the control notification(s) (block 916) and/or if the data fusion node 110 does not identify improvements to platform performance (block 914), the example data fusion node 110 updates a platform aeroelasticity database 138 with the platform navigation state (block 918). For example, the data fusion node 110 may store, in the platform aeroelasticity database 138 in the storage device 116 of FIG. 1, the speed of the platform 101 (e.g., relative to the earth), the position of the platform 101 (e.g., relative to the earth), the altitude of the platform 101 (e.g., relative to the earth), acceleration of the platform 101, angular velocity of the platform 101, bend of the structure of the platform 101 (e.g., bend between the structural locations 122-134), and/or twist of the structure of the platform 101 (e.g., deflection of the platform 101 measured with reference to the structural locations 122-134). In some examples, the data fusion node 110 stores additional information such as operational data 140, structural configurations, environmental data, and/or any other data available to the data fusion node 110. In some examples, the update to the platform aeroelasticity database 138 is time stamped. platform The example method 900 may then end and/or iterate to provide additional aeroelasticity and/or navigation information to a structural control system 120 of the platform 101.

Figure 10:
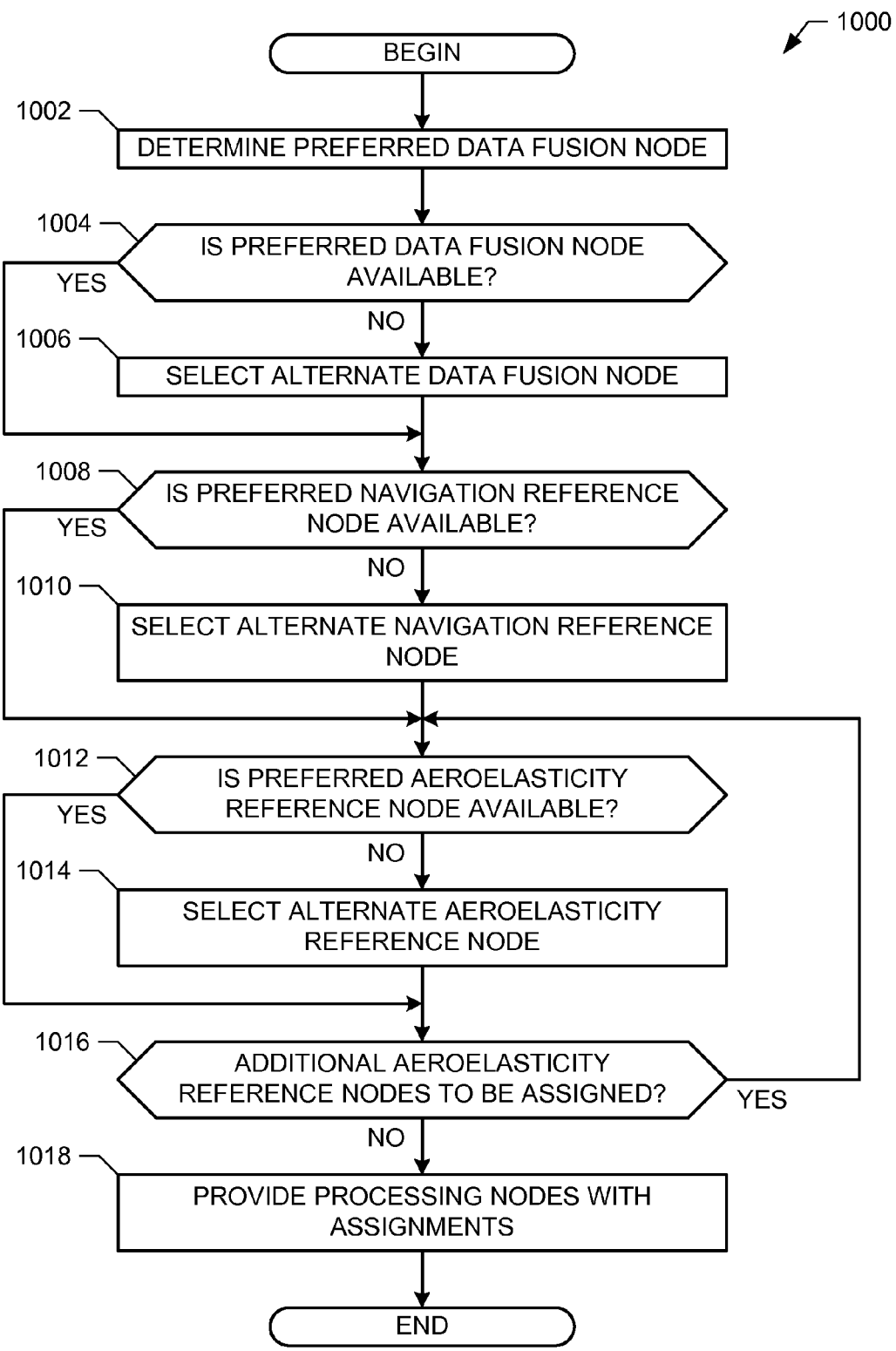
FIG. 10 is a flowchart representative of an example method to reconfigure an aeroelasticity measurement system.

FIG. 10 is a flowchart representative of an example method to reconfigure an aeroelasticity measurement system. The example method 1000 may be used by the example nodes 102-114 of FIG. 1 to reconfigure the system 100 and/or to implement block 714 of FIG. 7 to reconfigure surviving nodes based on one or more failed node(s). As used below, the term "preferred" refers to a preference for a node or function as expressed in a configuration, and does not necessarily refer to a preferred example, embodiment, or feature.

The example method 1000 begins by determining a preferred data fusion node (block 1002). For example, the nodes 102-114 may evaluate a network configuration table and/or configuration rules 144 to determine which of the nodes 102-114 is the preferred node 102-114 to function as the data fusion node 110. If the preferred data fusion node 110 is not available (block 1004), the example nodes 102-114 select an alternate one of the nodes 102-108, 112, 114 to perform data fusion node functions (block 1006). For example, the data fusion node 110 may not be available if it is offline and/or if it has been determined to have failed. An alternate data fusion node may be selected based on the network configuration table and/or configuration rules 144.

After selecting an alternate data fusion node (block 1006) or if the preferred data fusion node 110 is available (block 1004), the example nodes 102-114 determine whether a preferred navigation reference node is available (block 1008). If the preferred navigation reference node 112 is not available (block 1008), the example nodes 102-114 select another node 102-110, 114 to perform navigation reference node functions (block 1010). For example, the navigation reference node 112 may not be available if it is offline and/or if it has been determined to have failed. An alternate navigation reference node may be selected based on the network configuration table and/or configuration rules 144.

After selecting an alternate navigation reference node (block 1010) or if the preferred navigation reference node 112 is available (block 1008), the example nodes 102-114 determine whether a preferred aeroelasticity reference node is available (block 1012). If the preferred aeroelasticity reference node 114 is not available (block 1012), the example nodes 102-114 select another node 102-112 to perform aeroelasticity reference node functions (block 1014). For example, the aeroelasticity reference node 114 may not be available if it is offline and/or if it has been determined to have failed. An alternate aeroelasticity reference node may be selected based on the network configuration table and/or configuration rules 144.

After selecting an alternate aeroelasticity reference node (block 1014) or if the preferred aeroelasticity reference node 114 is available (block 1012), the example nodes 102-114 determine whether additional aeroelasticity reference nodes are to be assigned (block 1016). For example, multiple nodes may be assigned as aeroelasticity reference nodes to provide different aeroelasticity references to different ones of the processing nodes 102-108. If additional aeroelasticity reference nodes are to be assigned (block 1016), control returns to block 1012 to determine whether another preferred aeroelasticity reference node is available.

When no additional aeroelasticity reference nodes are to be assigned (block 1016), the assigned data fusion node, the assigned navigation reference node, and the assigned aeroelasticity reference node(s) provide the processing nodes 102-108 with the assignments (block 1018). For example, the assigned data fusion node and the assigned navigation reference node may provide the assignment information to each of the processing nodes 102-108. If there is one assigned aeroelasticity reference node, the assigned aeroelasticity reference node is identified to the processing nodes 102-108. On the other hand, if there are more than one assigned aeroelasticity reference nodes, each of the assigned aeroelasticity reference nodes provides the assignment to those of the processing nodes 102-108 that are to refer to the respective aeroelasticity reference node. The example method 1000 may then end and/or iterate to perform additional configurations of the system 100.

Figure 11:
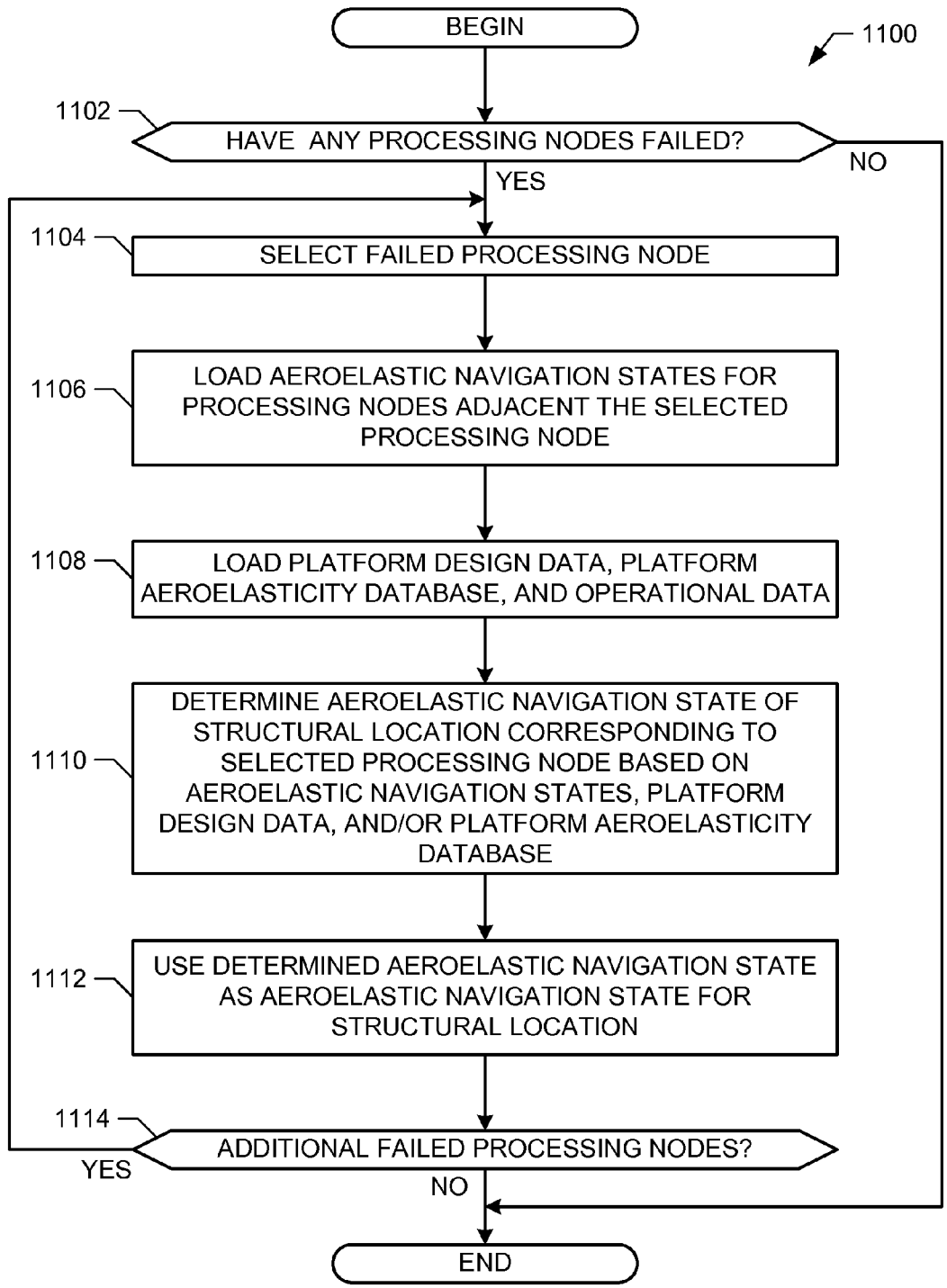
FIG. 11 is a flowchart representative of an example method to determine an aeroelasticity navigation state for a structural location corresponding to a failed processing node.

FIG. 11 is a flowchart representative of an example method 1100 to determine an aeroelasticity navigation state for a structural location corresponding to a failed processing node. The example method 1100 may be performed by any of the example nodes 102-114 of FIG. 1 to determine an aeroelasticity navigation state in the event one or more of the processing nodes 102-114 fails.

The example method 1100 begins by determining (e.g., at any of the nodes 102-114 such as the data fusion node 110) whether any of the processing nodes 102-108 has failed (block 1102). If none of the processing nodes 102-108 has failed (block 1102), the example method 1100 may end. On the other hand, if at least one of the processing nodes 102-108 has failed (block 1102), the data fusion node 110 selects a failed processing node (e.g., the processing node 102) (block 1104).

The example data fusion node 110 loads aeroelastic navigation states for processing nodes 104-108 adjacent the selected processing node 102 (block 1106). For example, the data fusion node 110 may receive the aeroelastic navigation states, corresponding to a time for which the aeroelastic navigation state of the structural location 122 is to be determined, from the processing nodes 104-108. The example data fusion node 110 also loads the platform design data 136, the platform aeroelasticity database 138, and/or operational data 140 (block 1108). For example, the data fusion node may obtain the platform design data 136 and/or the platform aeroelasticity database 138 from the storage device 116 and/or obtain the operation data from a control system 120 of the platform 101 via the platform interface 118.

The example data fusion node 110 determines an aeroelastic navigation state of the structural location 122 corresponding to the selected node 102 based on the aeroelastic navigation states, the platform design data 136, operational data 140, and/or the platform aeroelasticity database 138 (block 1110). For example, the data fusion node 110 may interpolate an aeroelastic navigation state based on other (e.g., adjacent) aeroelastic navigation states, determine an aeroelastic navigation state for the structural location 122 based on the received aeroelastic navigation states and the platform design data 136 (e.g., determine what the aeroelastic navigation state for the structural location 122 should be based on other aeroelastic navigation states), determine (e.g., look up and/or calculate) the aeroelastic navigation state for the structural location 122 based on the aeroelastic navigation state for the structural location 122 for similar aeroelastic navigation states and/or conditions.

The example data fusion node 110 uses the determined aeroelastic navigation state as the aeroelastic navigation state for the structural location 122 (block 1112). For example, the data fusion node 110 may use the determined aeroelastic navigation state when generating notifications, determining a platform navigation state, and/or updating the platform aeroelasticity database 138. In some examples, the data fusion node 110 does not use the determined aeroelastic navigation state when performing parity checks of the system 100.

The example data fusion node 110 determines whether there are additional failed processing nodes (block 1114). If there are additional failed processing nodes (block 1114), control returns to block 1104 to select another failed processing node. If there are no additional failed processing nodes (block 1114), the example method 1100 may end and/or iterate to determine additional aeroelastic navigation states for failed processing nodes 102-108.

Figure 12:
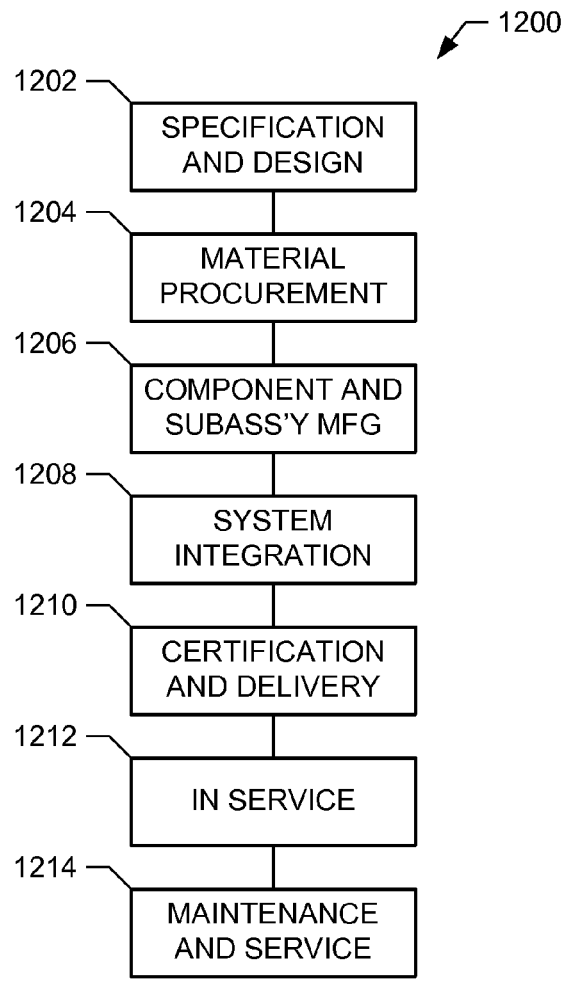
FIG. 12 is a flowchart of platform production and service methodology.
Figure 13:
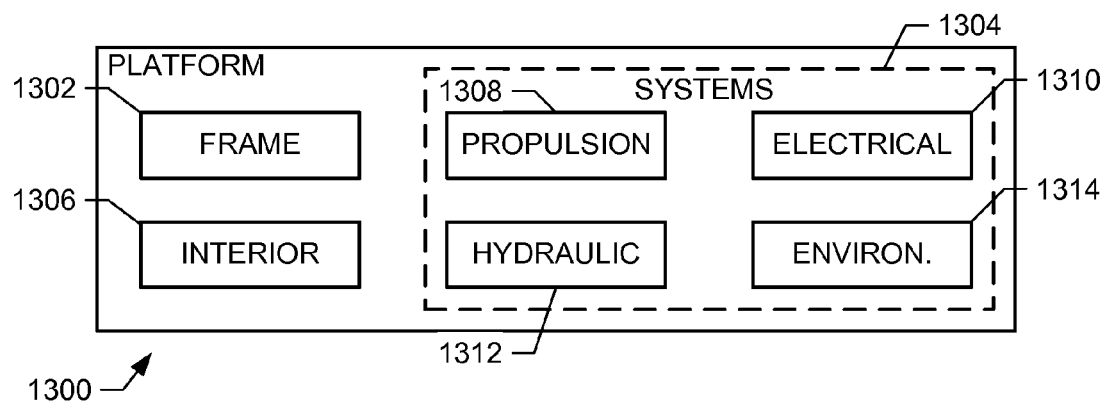
FIG. 13 is a block diagram of a platform.

Embodiments of the disclosure may be described in the context of a platform manufacturing and service method 1200 as shown in FIG. 12 and a platform 1300, such as an aircraft, as shown in FIG. 13. During pre-production, the example method 1200 may include specification and design (block 1202) of the platform 1300 (e.g., an aircraft) and material procurement (block 1204). The specification and design may result in generation of the design data 136 that is provided to the example system 100 of FIG. 1. During production, component and subassembly manufacturing (block 1206) and system integration (block 1208) of the platform 1300 (e.g., an aircraft) takes place. During component and subassembly manufacturing (block 1206) and/or system integration (block 1208), processing nodes may be attached (e.g., affixed) to structural locations of the platform 1300 (e.g., an aircraft), such as locations on an airframe 1302 and/or an interior 1306 of the platform 1300. The processing nodes may further be connected to one or more systems 1304 of the platform 1300. Thereafter, the platform 1300 (e.g., an aircraft) may go through certification and delivery (block 1210) in order to be placed in service (block 1212). While in service by a customer, the platform 1300 (e.g., an aircraft) is scheduled for routine maintenance and service (block 1214), which may also include modification, reconfiguration, refurbishment, etc. During maintenance and service (block 1214), a platform aeroelasticity database 138 may be downloaded from the platform 1300 (e.g., an aircraft) for analysis and/or evaluation (e.g., identification of maintenance activities to be performed on the platform 1300).

Each of the operations of the example method 1200 may be performed or carried out by a system integrator, a third party, and/or an operator (e.g., a customer). For the purposes of this description, a system integrator may include without limitation any number of platform (e.g., aircraft) manufacturers and major-system subcontractors; a third party may include without limitation any number of venders, subcontractors, and suppliers; and an operator may be an airline, leasing company, military entity, service organization, and so on.

As shown in FIG. 13, the platform 1300 (e.g., aircraft) produced by example method 1200 may include a frame 1302 (e.g., an airframe) with a plurality of systems 1304 and an interior 1306. Examples of high-level systems 1304 include one or more of a propulsion system 1308, an electrical system 1310, a hydraulic system 1312, and an environmental system 1314. The example methods and apparatus disclosed herein may be integrated into any of the frame 1302, the systems 1304-1314, and/or the interior 1306 to, for example, control steering of a landing gear of the platform 1300 (e.g., aircraft). Any number of other systems may be included. Although an aerospace example is shown, the principles disclosed herein may be applied to other industries, such as the automotive industry.

Apparatus and methods embodied herein may be employed during any one or more of the stages of the production and service method 1200. In some examples, apparatus and methods embodied herein provide vibration damping that is tuned during the component or subassembly manufacturing process (block 1206). For example, components or subassemblies corresponding to production process 1208 may be fabricated or manufactured in a manner similar to components or subassemblies produced while the platform 1300 (e.g., aircraft) is in service. Also, one or more apparatus embodiments, method embodiments, or a combination thereof may be utilized during the production stages 1208 and 1210, for example, by substantially expediting assembly of or reducing the cost of a platform 1300 (e.g., aircraft). Similarly, one or more of apparatus embodiments, method embodiments, or a combination thereof may be utilized while the platform 1300 (e.g., aircraft) is in service, for example and without limitation, to maintenance and service 1214.

High performance aircraft with non-traditional structures and/or large wing spans may use systems and methods disclosed herein to obtain the platform navigation states that include information on structural twist and bending at any given time and, in the event of a failure, can be reconfigured, structurally or otherwise, in real time without compromising flight safety. Actively-controlled structures of flexible, non-traditional aircraft may be structurally stabilized and/or controlled using example systems and methods disclosed herein to, for example, direct a solar panel at the sun and/or maintain a line-of-sight to a ground target. Such stabilization and control are facilitated by determining a whole-platform navigation state that includes aeroelasticity measurements.

Although certain example apparatus and methods have been described herein, the scope of coverage of this disclosure is not limited thereto. On the contrary, this disclosure covers all apparatus and methods fairly falling within the scope of the appended claims.

What is claimed is:

1. A system, comprising:
a first processing node associated with a first structural location of a platform, the first processing node to determine a first aeroelastic navigation state of the platform at the first structural location of the platform with respect to a first aeroelasticity reference;
a second processing node associated with a second structural location of the platform different than the first structural location, the second processing node to determine a second aeroelastic navigation state of the platform at the second structural location of the platform with respect to the first aeroelasticity reference or a second aeroelasticity reference; and
a storage device to store a platform navigation state based on at least one of the first or second aeroelastic navigation states.

2. A system as defined in claim 1, wherein the first processing node comprises an inertial measurement unit to perform an inertial measurement of the first structural location.

3. A system as defined in claim 2, wherein the first processing node further comprises a logic circuit to determine the first aeroelastic navigation state based on an inertial state.

4. A system as defined in claim 3, wherein the first processing node further comprises a deflection sensor to determine a structural deflection of the platform with respect to the first structural location, the first aeroelastic navigation state being based on the structural deflection.

5. A system as defined in claim 1, further comprising a data fusion node to provide at least one of the platform navigation state or an event notification to a structural control system of the platform.

6. A system as defined in claim 5, wherein the data fusion node is to identify an event based on a comparison of at least one of: the first aeroelastic navigation state, the second aeroelastic navigation state, or the platform navigation state to a platform structural health threshold.

7. A system as defined in claim 1, further comprising an aeroelasticity reference node to:
determine the first aeroelasticity reference based on a third aeroelastic navigation state of a third structural location of the platform; and
provide the first aeroelasticity reference to the first processing node.

8. A system as defined in claim 1, further comprising a navigation reference node to determine a reference navigation state of the platform based on the first aeroelasticity reference.

9. A system as defined in claim 8, wherein the reference navigation state is based on a calculated center of gravity of the platform.

10. A system as defined in claim 8, wherein the navigation reference node is to store the reference navigation state, the reference navigation state including the first and second aeroelastic navigation states and a time stamp.

11. A system as defined in claim 1, further comprising a navigation reference node to determine a reference navigation state of the platform based on the first and second aeroelastic navigation states of the platform.

12. A method, comprising:
determining, using a first logic circuit at a first processing node associated with a first structural location of a platform, a first aeroelastic navigation state of the platform at the first structural location of the platform with respect to a first aeroelasticity reference; and
determining, using a second logic circuit at a second processing node associated with a second structural location of the platform, a second aeroelastic navigation state of the platform at the second structural location of the platform with respect to the first aeroelasticity reference or a second aeroelasticity reference; and
storing a platform navigation state based on at least one of the first or second aeroelastic navigation states.

13. A method as defined in claim 12, wherein the first and second aeroelastic navigation states are time-synchronized.

14. A method as defined in claim 12, wherein determining the first aeroelastic navigation state comprises measuring an inertial state of the first structural location.

15. A method as defined in claim 14, wherein determining the first aeroelastic navigation state further comprises measuring a deflection of a structure of the platform with reference to the first structural location.

16. A method as defined in claim 12, further comprising transferring the first and second aeroelastic navigation states between the first and second logic circuits, storing the first aeroelastic navigation state via the second logic circuit, and storing the second aeroelastic navigation state via the first logic circuit.

17. A method as defined in claim 12, further comprising:
generating a parity vector based on the first and second aeroelastic navigation states; and
processing the parity vector to identify an error in at least one of the first or second aeroelastic navigation states.

18. A method as defined in claim 12, further comprising calculating, via the first logic circuit, a third aeroelastic navigation state of the platform at the second structural location of the platform.

19. A method as defined in claim 12, further comprising calculating a third aeroelastic navigation state at the first structural location of the platform with respect to the second aeroelastic navigation state.

20. A method as defined in claim 12, further comprising storing the platform navigation state based on a plurality of aeroelastic navigation states of the platform for a corresponding plurality of structural locations, the plurality of aeroelastic navigation states of the platform including the first and second aeroelastic navigation states and the plurality of structural locations of the platform including the first and second structural locations.

21. A method as defined in claim 12, further comprising providing the platform navigation state to a structural control system of the platform.

22. A method as defined in claim 12, wherein determining the first aeroelastic navigation state is based on historical aeroelastic navigation states.

23. A method as defined in claim 12, wherein determining the first aeroelastic navigation state is based on design data of the platform.

24. A system as defined in claim 1, wherein the second processing node is located at the second structural location and comprises:
a second inertial measurement unit to perform a second inertial measurement of the second structural location; and
a logic circuit to determine the second aeroelastic navigation state based on the second inertial measurement unit.

25. A system as defined in claim 1, wherein the first processing node is to determine a third aeroelastic navigation state of the platform at a third structural location of the platform, the third structural location of the platform being adjacent the first structural location of the platform and the third structural location of the platform corresponding to a third processing node.

* * * * *